(12) United States Patent
Reynolds et al.

(10) Patent No.: US 9,153,974 B2
(45) Date of Patent: Oct. 6, 2015

(54) BATTERY PARALLEL BALANCING CIRCUIT

(75) Inventors: Michael G. Reynolds, Troy, MI (US);
Chandra S. Namuduri, Troy, MI (US);
Peter T. Karlson, Whitby (CA); Daniel G. Foisy, Pickering (CA)

(73) Assignee: GM Global Technology Operations LLC, Detroit, MI (US)

( * ) Notice: Subject to any disclaimer, the term of this patent is extended or adjusted under 35 U.S.C. 154(b) by 515 days.

(21) Appl. No.: 13/495,902

(22) Filed: Jun. 13, 2012

(65) Prior Publication Data
US 2013/0335026 A1 Dec. 19, 2013

(51) Int. Cl.
*H02J 7/02* (2006.01)
*H02J 7/00* (2006.01)

(52) U.S. Cl.
CPC ............ *H02J 7/0016* (2013.01); *Y02T 10/7055* (2013.01)

(58) Field of Classification Search
CPC . Y02T 90/34; B60L 11/1879; B60L 11/1861; B60L 11/1811; H02J 7/0016; H02J 7/0045; H02J 7/0013; H02J 7/0068; H02J 7/34; H01M 10/482; H01M 10/48; H01M 10/425
USPC ......... 320/124, 103, 132, 134, 116, 128, 104, 320/114, 138
See application file for complete search history.

(56) References Cited

U.S. PATENT DOCUMENTS

| | | | | |
|---|---|---|---|---|
| 4,140,958 A * | 2/1979 | Groeschel | | 320/133 |
| 4,290,007 A | 9/1981 | Fisher et al. | | |
| 6,037,750 A * | 3/2000 | Von Novak | | 320/132 |
| 7,633,284 B2 * | 12/2009 | Ingram et al. | | 324/76.11 |
| 7,782,017 B2 * | 8/2010 | Hack et al. | | 320/132 |
| 8,030,880 B2 * | 10/2011 | Alston et al. | | 320/103 |
| 8,143,870 B2 * | 3/2012 | Ng et al. | | 323/277 |
| 2005/0212489 A1 * | 9/2005 | Denning et al. | | 320/134 |
| 2006/0152194 A1 * | 7/2006 | Wang et al. | | 320/121 |
| 2007/0024243 A1 * | 2/2007 | Liu et al. | | 320/134 |
| 2007/0188140 A1 * | 8/2007 | Chen | | 320/128 |
| 2008/0054855 A1 * | 3/2008 | Hussain et al. | | 320/162 |
| 2010/0134065 A1 * | 6/2010 | Iida | | 320/103 |
| 2011/0057621 A1 * | 3/2011 | Hong | | 320/134 |
| 2011/0074354 A1 * | 3/2011 | Yano | | 320/116 |
| 2012/0105008 A1 | 5/2012 | Lipcsei et al. | | |
| 2012/0319652 A1 * | 12/2012 | Namou et al. | | 320/116 |

\* cited by examiner

*Primary Examiner* — Brian Ngo
(74) *Attorney, Agent, or Firm* — John A. Miller; Miller IP Group, PLC

(57) ABSTRACT

A method and device for regulating charging and discharging current through a battery pack. Two or more battery packs are connected in parallel to an inverter, such that the inverter can use grid power to charge the battery packs or the battery packs can provide AC power through the inverter. A current balancing circuit device is placed in series with each battery pack and is used to regulate the current through the battery pack so that none of the battery packs is excessively charged or discharged. The current balancing circuit includes two field effect transistors (FETs) arranged in series and in opposite directions, where one FET controls charging current and the other controls discharging current. The balancing circuit also includes a current sensor, and uses proportional-integral control to provide a signal to the FETs such that the actual current flowing through the circuit is regulated to a target current value.

18 Claims, 3 Drawing Sheets

BATTERY PARALLEL BALANCING CIRCUIT

BACKGROUND OF THE INVENTION

1. Field of the Invention

This invention relates generally to a current regulating circuit and, more particularly, to a method and apparatus for regulating charging and discharging current between two or more parallel-connected battery packs having varying states of health or states of charge, where the apparatus includes no mechanical switches or relays and uses field effect transistors, a current sensor and a control stage to achieve a desired current through each of the parallel battery packs.

2. Discussion of the Related Art

Electric vehicles and gasoline- or diesel-electric hybrid vehicles are rapidly gaining popularity in today's automotive marketplace. Electric and hybrid vehicles offer several desirable features, such as reduced emissions, reduced usage of petroleum-based fuels, and potentially lower operating costs. A key component of both electric and hybrid vehicles is the battery pack. Battery packs in these vehicles typically consist of numerous interconnected cells, which can deliver significant power on demand for propulsion of the vehicle.

For a variety of reasons, including end of vehicle life, battery packs or sections of battery packs can be removed from in-vehicle service. These battery packs or battery pack sections may have reduced energy capacity (state of health) relative to the capacity when they entered in-vehicle service. Yet, even with a somewhat reduced state of health, an electric vehicle battery pack can still store a considerable amount of energy, and can be used for other applications besides powering a vehicle. A variety of different post-vehicle-life uses for such battery packs have been proposed, including using the battery packs in Community Energy Storage (CES) systems.

CES systems store energy for a small community, such as a residential subdivision or a commercial or industrial complex. CES systems typically serve to augment power available from the utility grid, store locally-generated energy from sources such as solar and wind, and provide a backup energy source in the event of a failure of power from the utility grid. Post-vehicle-life battery packs from electric vehicles can be used in CES systems, but the connection of multiple battery packs in parallel is complicated by variations in the state of health of sections of the battery packs. This variation is problematic because multiple battery packs in parallel will charge and discharge at different rates if the battery packs have different capacities, which they are likely to have in a post-vehicle use scenario. If current is not regulated, the differences in charging and discharging rates between the battery packs may cause excessive charging or discharging of some battery packs or cells, resulting in damage.

Various current regulating devices are known in the art, ranging from simple resistive balancers to the transistorized circuit disclosed in U.S. Pat. No. 4,290,007 issued to Fisher et al. While the Fisher et al. device overcomes some disadvantages of resistive balancers and earlier transistor circuits, current flow through the transistor is intended to be unidirectional. Use of a DPDT switch is required to appropriately connect the transistor between the battery and the supply/load to keep the transistor forward biased during use, to maximize the amount of current the transistor can control. If the transistor is reverse biased, the amount of current it can control is severely limited. A method and device are needed for seamlessly regulating both charging and discharging current through each battery pack in a multiple battery pack parallel-connected system.

SUMMARY OF THE INVENTION

In accordance with the teachings of the present invention, a method and device are disclosed for regulating charging and discharging current through a battery pack. Two or more battery packs, which may have differing energy storage capacities, are connected in parallel to an inverter, such that the inverter can use grid power to charge the battery packs or the battery packs can provide AC power through the inverter. A current balancing circuit device is placed in series with each battery pack and is used to regulate the current through the battery pack so that none of the battery packs is excessively charged or discharged. The current balancing circuit includes two field effect transistors (FETs) arranged in series and in opposite directions, such that one FET controls charging current and the other controls discharging current. The balancing circuit also includes a current sensor, and uses proportional-integral control to provide a signal to the gates of the FETs such that the actual current flowing through the circuit is regulated to a target current value, where the target current value for each battery pack is determined so as to provide balanced charging and discharging among the plurality of battery packs.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a battery parallel balancing circuit is merely exemplary in nature, and is in no way intended to limit the invention or its applications or uses.

Electric vehicles and engine/electric hybrid vehicles (hereinafter described simply as electric vehicles) are becoming increasingly popular and viable as various enabling technologies improve. One factor that all such vehicles have in common is the need for a high-capacity battery pack for energy storage. Eventually, a battery pack will have to be replaced in an electric vehicle, so the vehicle driving range can be maintained at an acceptable level. The post-vehicle-life battery pack may no longer be suitable for use in an electric vehicle, but still retains considerable energy storage capability. In order to use such battery packs effectively in post-vehicle applications such as Community Energy Storage, it would be beneficial to be able to manage charging and discharging current in battery systems containing multiple battery packs with a range of states of health.

Figure 1:
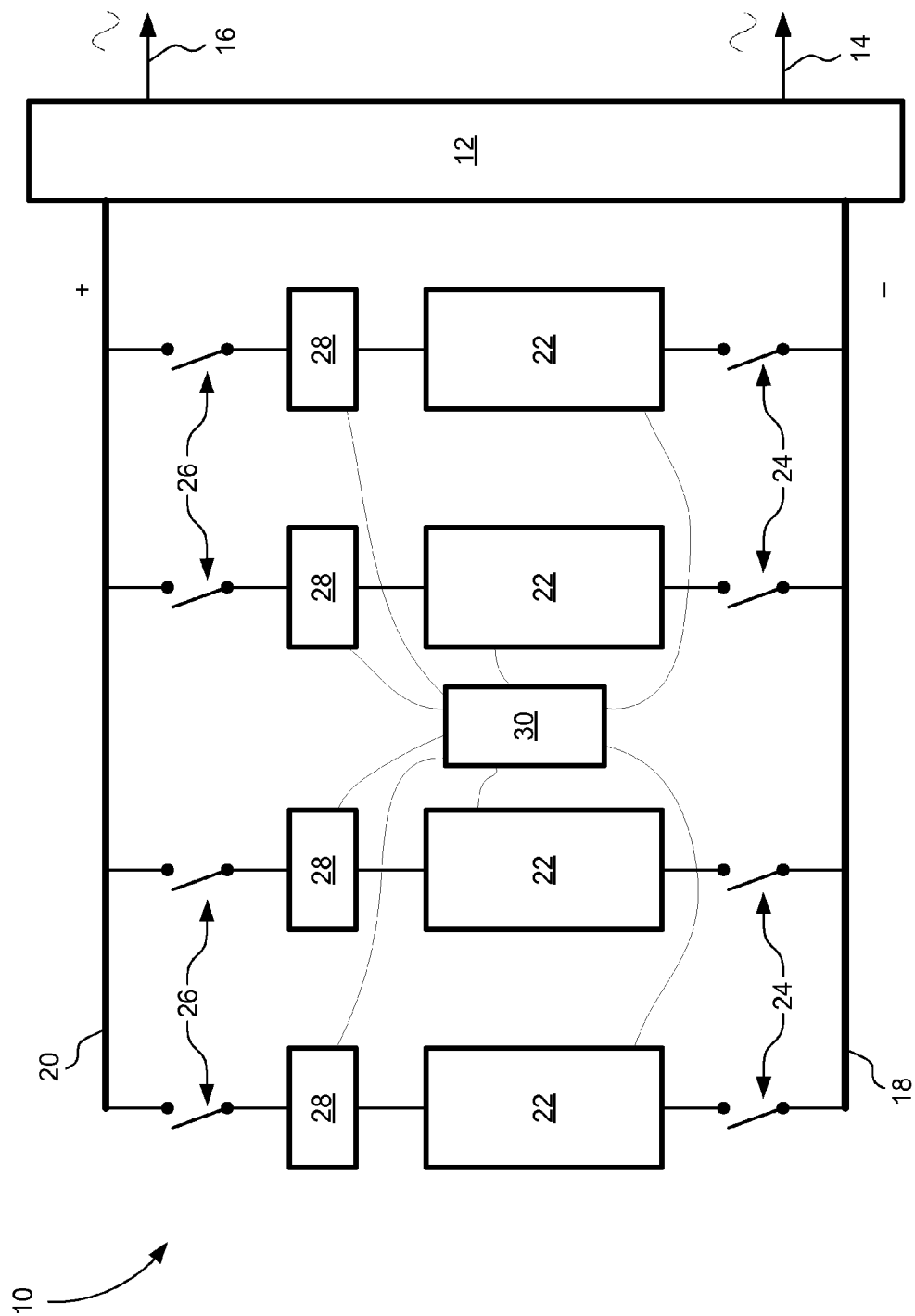
FIG. 1 is a block diagram of a system in which a parallel balancing circuit is used to regulate the flow of charging and discharging current through each of a plurality of battery packs connected to an inverter.

FIG. 1 is a block diagram of a system 10 in which a parallel balancing circuit is used to regulate the flow of charging and discharging current through each of a plurality of battery packs. An inverter 12 is connected to the utility power grid or equivalent via alternating current (AC) lines 14 and 16. On the direct current (DC) side, the inverter 12 is connected to a negative bus 18 and a positive bus 20. Between the buses 18 and 20, two or more battery packs 22 are arranged in parallel, such that the inverter can use grid power rectified to DC to charge the battery packs 22, or the battery packs 22 can provide power to the inverter 12 which can invert it to AC and provide the AC power to the grid or other consumer. The battery packs 22 are connected to the buses 18 and 20 via contactors 24 and 26.

As discussed previously, the battery packs 22 used in this consumer power or CES system may have already seen several years of service in an electric vehicle. Thus, each of the battery packs 22 may have a different state of health, reflected in varying energy storage capacities, and varying rates of charge and discharge. The battery packs 22 may even be of different chemistries and thus have different charge and discharge characteristics. If the battery packs 22 were connected directly to the buses 18 and 20, where each of the battery packs 22 experienced the same voltage potential, then the varying battery pack characteristics would result in some battery packs 22 charging or discharging faster than others. Thus, there is a need for current regulation in the system 10 in order to prevent excessively charging or discharging any of the battery packs 22.

As shown in FIG. 1, each of the battery packs 22 can be accompanied by a parallel balancing circuit 28, where the parallel balancing circuit 28 is so named not because it balances current to the same value for each of the battery packs 22, but because it balances current to an appropriate value based on the state of health of each of the battery packs 22. That is, if some of the battery packs 22 can provide a higher discharging current than others, the parallel balancing circuit 28 is used to regulate the current accordingly. A supervisory battery controller 30 communicates with the battery packs 22 and the parallel balancing circuits 28, monitors conditions of each of the battery packs 22 and provides appropriate charging or discharging target current commands to each of the parallel balancing circuits 28, as will be discussed in detail below.

Figure 2:
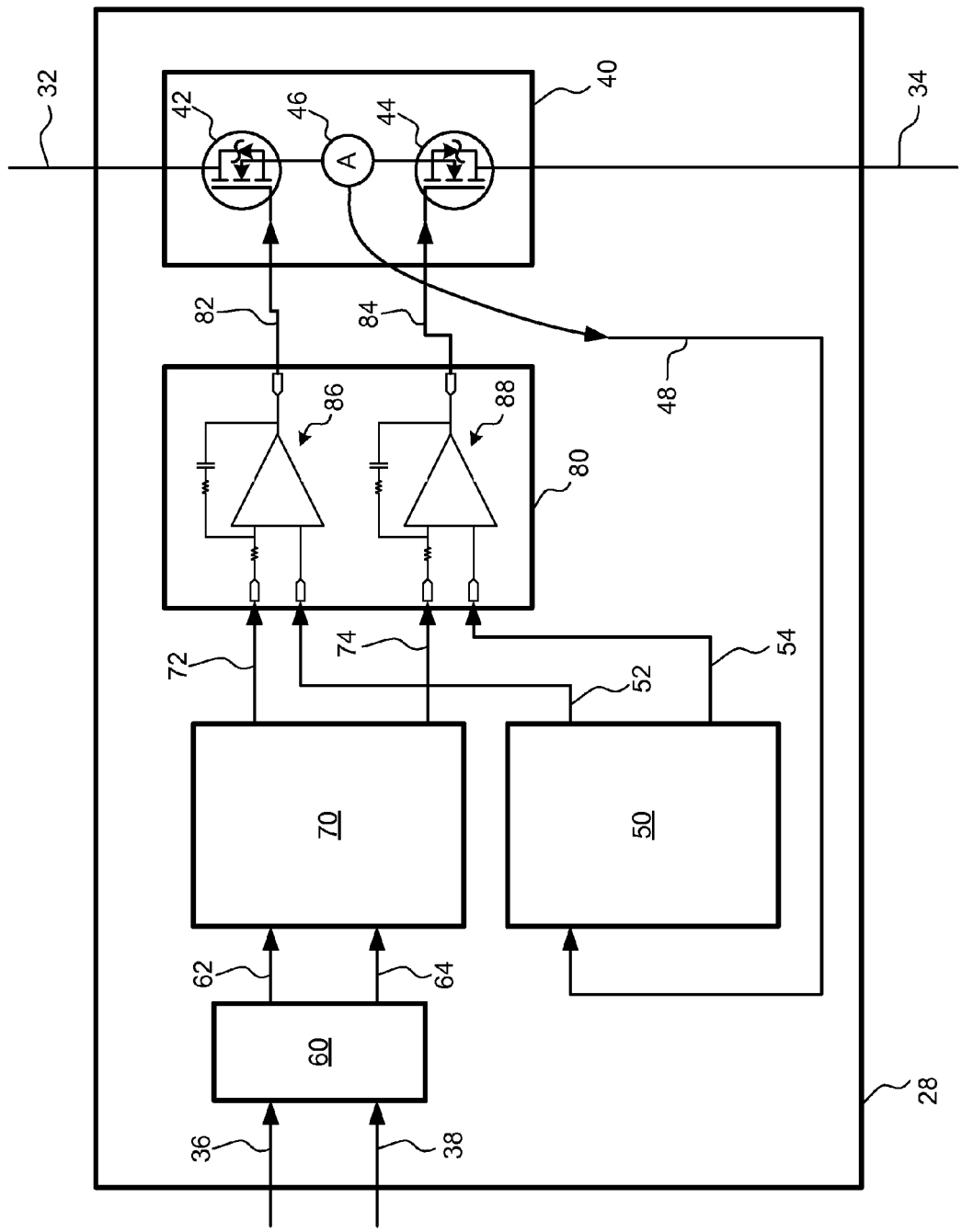
FIG. 2 is a block diagram of the parallel balancing circuit shown in FIG. 1.

FIG. 2 is a block diagram and partial schematic diagram of the parallel balancing circuit 28. The parallel balancing circuit 28 is connected to the contactor 26 and the battery pack 22 via lines 32 and 34, respectively. The parallel balancing circuit 28 also receives target current commands from the supervisory battery controller 30 on lines 36 and 38.

The parallel balancing circuit 28 includes a power module 40 which comprises two field effect transistors (FETs) 42 and 44, and a current sensor 46. The FETs 42 and 44 are placed in series and oriented in opposite directions from each other, such that one can control charging current and the other can control discharging current. The parallel balancing circuit 28 further includes control circuitry to regulate current via the FETs 42 and 44, according to the following discussion.

The current sensor 46 provides a signal on line 48 indicating the actual current and current direction flowing through the power module 40—that is, through the FETs 42 and 44. The current signal on the line 48 is received by a current signal conditioning module 50, which filters and scales the current signal, and provides a conditioned current signal on line 52. The current signal conditioning module 50 also provides as output, on line 54, a conditioned current signal which is the negative of the conditioned current signal on the line 52. The two conditioned current signals on the lines 52 and 54, being of equal magnitude and opposite sign, are used in control loops which control the FETs 42 and 44.

The target current command on the line 36 represents the target current value for charging mode (current flowing from the positive bus through the parallel balancing circuit 28 and into the battery pack 22), while the target current command on the line 38 represents the target current value for discharging mode. The target charging current will generally be different from the target discharging current due to the fact that the batteries can discharge at a higher rate than they can be charged. The target current commands on the lines 36 and 38 are in the form of a pulse width modulation (PWM) duty cycle, where a low duty cycle percentage indicates a command for low or no current, and a high duty cycle percentage indicates a command for a high current. The PWM current commands on the lines 36 and 38 are received by a voltage isolation module 60, which provides PWM current command output for charging and discharging on lines 62 and 64, respectively. The voltage isolation module 60 does not modify the PWM current command signal, it just provides electrical isolation of the lines 36 and 38 from the lines 62 and 64. Voltage isolation techniques are known in the art, including the widely-used optical isolation technique.

It is also possible that only a single PWM current command signal is provided to the parallel balancing circuit 28, where the single PWM current command signal represents the target current value for the mode in which the parallel balancing circuit 28 is currently operating, whether charging or discharging. The two PWM current command signals, on the lines 36 and 38, are shown and discussed here for clarity and generality.

The PWM current command signals on the lines 62 and 64 are received by a PWM conversion module 70. The PWM conversion module 70 converts the PWM current command signals from a duty cycle percentage into a target current value in amps. In one embodiment, the PWM conversion module 70 can be configured as follows: a duty cycle of 10% or less on the line 62 or 64 results in a target current value of zero (FETs are off); a duty cycle of 90% or more on the line 62 or 64 results in maximum available current (no regulation—FETs are fully on); and a duty cycle between 10% and 90% results in a target current between about 100 milliamps (mA) and about 12 amps (A). The supervisory battery controller 30 can be designed so that the parallel balancing circuit 28 is biased toward a full-on operation or a full-off condition as much as possible, as there are minimal losses across the FETs 42 and 44 in those cases.

The target current values for charging and discharging are provided as output of the PWM conversion module 70 on lines 72 and 74, respectively. A proportional-integral (P-I) control module 80 receives the target current values from the PWM conversion module 70 and the actual current signals from the current signal conditioning module 50 and provides signals on lines 82 and 84 to adjust the FETs 42 and 44 so as to regulate the actual current to match the target current. Other control strategies could be used in the control module 80, such as proportional-integral-differential, or simply proportional.

The P-I control module 80 includes a charging P-I loop 86 and a discharging P-I loop 88. The charging P-I loop 86 receives the target charging current value on the line 72 and the actual current value on the line 52. The charging P-I loop 86 computes a control signal based on the difference or "error" between the target charging current value and the actual current value. The control signal on the line 82 is directed to the gate of the FET 42, thus controlling the FET 42 to provide more or less resistance as needed to minimize the error. In a charging scenario, the charging P-I loop 86 compares a target charging current value (for example, 5 amps) with an actual current value (for example, 4.8 amps). If the actual current value is too low (or there is accumulated negative error in the integral), then the charging P-I loop 86 increases the voltage signal on the line 82, thus causing the FET 42 to decrease resistance and allow increased current flow. In a discharging scenario, the charging P-I loop 86 compares a target charging current value (for example, 5 amps) with an actual current value (which in discharging will be negative, for example, −4.8 amps). Because the actual current value is far below the target, the charging P-I loop 86 increases the voltage signal on the line 82 to the maximum allowable, thus forcing the FET 42 to a minimum resistance state such that the FET 42 provides unrestricted discharging current (the FET 44 may restrict discharging current).

The discharging P-I loop 88 receives the target discharging current value on the line 74 and the negative of the actual current value on the line 54. The discharging P-I loop 88 computes a control signal based on the difference or "error" between the target discharging current value and the negative of the actual current value. The control signal on the line 84 is directed to the gate of the FET 44, thus controlling the FET 44 to provide more or less resistance as needed to minimize the error. In a discharging scenario, the discharging P-I loop 88 compares a target discharging current value (for example, 5 amps) with the negative of the actual current value (the negative of a discharging current would be positive, for example, 4.8 amps). If the actual current value is too low (or there is accumulated negative error in the integral), then the discharging P-I loop 88 increases the voltage signal on the line 84, thus causing the FET 44 to decrease resistance and allow increased current flow. In a charging scenario, the discharging P-I loop 88 compares a target discharging current value (for example, 5 amps) with the negative of the actual current value (for example, −4.8 amps). Because the actual current value is far below the target, the discharging P-I loop 88 increases the voltage signal on the line 84 to the maximum allowable, thus forcing the FET 44 to a minimum resistance state such that the FET 44 provides unrestricted charging current (the FET 42 may restrict charging current).

Ultimately, in any charging scenario, the FET 42 is controlling charging current (anywhere from unrestricted to highly restricted or blocked) and the FET 44 presents its minimum resistance. Alternatively, in any discharging scenario, the FET 42 presents its minimum resistance and the FET 44 is controlling discharging current (anywhere from unrestricted to highly restricted or blocked). Thus, the parallel balancing circuit 28 provides the ability to control both charging and discharging current, including seamlessly changing from charging to discharging control with no switches or relays.

Figure 3:
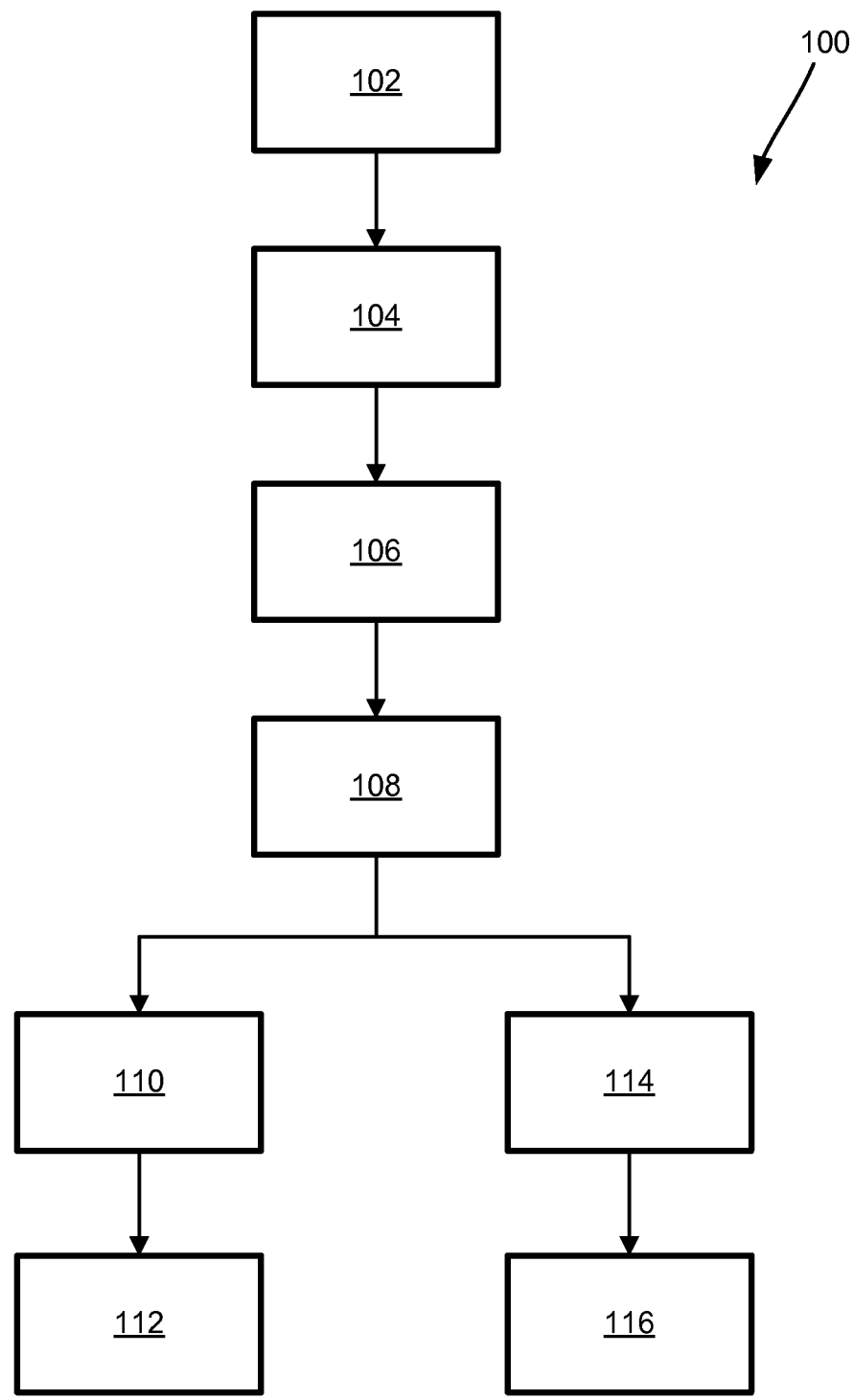
FIG. 3 is a flow chart diagram of a method for regulating charging and discharging current through a battery pack using a digital controller.

FIG. 3 is a flow chart diagram 100 of a method for regulating charging and discharging current through one of the battery packs 22 using a digital controller. The flow chart diagram 100 describes the steps performed by the modules 40-80 of the parallel balancing circuit 28, along with the signals passing into and out of said modules.

At box 102, target values for charging and discharging current are provided. The target current values may be in the form of a PWM duty cycle signal. At box 104, the PWM duty cycle signals are electrically isolated from their source using an optical isolation technique, if needed. At box 106, the PWM duty cycle signals are converted to target current values in amps. Pre-defined logic can be used to convert from duty cycle percentages to current values, where the current values can range from zero to unrestricted, as discussed previously.

At box 108, an actual current value is measured using the current sensor 46, which is arranged in a series circuit with the charging FET 42 and the discharging FET 44 in the parallel balancing circuit 28. At box 110, a charging control signal is determined by a charging control circuit. In a discharging scenario, the charging control signal is set to a high value, such that the charging FET 42 is commanded to a low resistance mode of operation. In a charging scenario, the charging control signal is set based on the error between the actual measured current value from the box 108 and the target charging current value from the box 106. At box 112, the charging control signal is provided to the gate terminal of the charging FET 42, which adjusts charging current accordingly.

At box 114, a discharging control signal is determined by a discharging control circuit. In a charging scenario, the discharging control signal is set to a high value, such that the discharging FET 44 is commanded to a low resistance mode of operation. In a discharging scenario, the discharging control signal is set based on the error between the negative of the actual measured current value from the box 108 and the target discharging current value from the box 106. At box 114, the discharging control signal is provided to the gate terminal of the discharging FET 44, which adjusts discharging current accordingly.

Using the parallel balancing circuit 28 with each of the battery packs 22 in a parallel arrangement such as the energy storage system shown in FIG. 1, the need for battery pack sorting and capacity-matching is minimized. In this way, battery packs of varying energy storage capacity can be used together, thus providing a productive usage of post-vehicle-life battery packs.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A battery parallel balancing device for regulating current to or from an attached battery pack, said device comprising:
   a charging field effect transistor (FET) and a discharging FET connected in series and oriented in opposite directions;
   a current sensor in series with the FETs, for measuring an actual current through the FETs, and the current sensor positioned between the charging FET and the discharging FET; and
   a control stage for adjusting a resistance of the charging FET and a resistance of the discharging FET, where the charging FET regulates the actual current to a charging target current value when the battery pack is charging and the discharging FET regulates the actual current to a discharging target current value when the battery pack is discharging, where the control stage includes a first proportional-integral control loop for the charging FET and a second proportional-integral control loop for the discharging FET, and where each of the control loops computes a control signal based on an error between the target current value and the actual current value through the FETs and provides the control signal to a gate terminal of the FET which it controls.

2. The device of claim 1 wherein the actual current value used by the second control loop is the negative of the actual current value used by the first control loop.

3. The device of claim 1 wherein the charging FET provides minimal restriction to discharging current, and the discharging FET provides minimal restriction to charging current.

4. The device of claim 1 wherein the charging target current value and the discharging target current value are provided by a supervisory battery controller which monitors conditions in a plurality of battery packs.

5. The device of claim 4 wherein the battery parallel balancing device, the supervisory battery controller, the plurality of battery packs and an inverter are integrated in an automated energy storage system.

6. The device of claim 1 further comprising a pulse width modulation (PWM) conversion module for converting a charging PWM duty cycle signal into the charging target current value and converting a discharging PWM duty cycle signal into the discharging target current value.

7. The device of claim 6 wherein a duty cycle of 10% or less is converted to a target current value of zero, and a duty cycle of 90% or more is converted to an unrestricted target current value.

8. The device of claim 6 further comprising a voltage isolation module which electrically isolates the duty cycle signals using optical isolation.

9. An energy storage system comprising:
 two or more battery packs connected in parallel;
 an inverter for charging the battery packs using alternating current (AC) power as input, or for using energy from the battery packs to provide AC power output to a consumer;
 a supervisory battery controller for monitoring conditions in the battery packs and determining a charging and discharging target current value for each of the battery packs; and
 a battery parallel balancing device in series with each of the battery packs and in communication with the supervisory battery controller, where the battery parallel balancing device regulates an actual charging current to the charging target current value if the inverter is charging the battery packs and regulates an actual discharging current to the discharging target current value if the inverter is discharging the battery packs, where the battery parallel balancing device includes a charging field effect transistor (FET), a discharging FET and a current sensor arranged in series and positioned between the charging FET and the discharging FET, and a control stage which controls the FETs based on an error between the charging or discharging target current value and an actual current value through the FETs measured by the current sensor.

10. The system of claim 9 wherein the two or more battery packs have different states of health, different storage capacities, or different chemistries.

11. The system of claim 9 wherein the control stage adjusts a resistance of the charging FET to control charging current or a resistance of the discharging FET to control discharging current.

12. The system of claim 11 wherein the control stage uses proportional-integral control.

13. A method for regulating charging and discharging current through a battery pack, said method comprising:
 providing charging and discharging target current values;
 providing a current regulation device including a charging field effect transistor (FET) and a discharging FET connected in series and oriented in opposite directions, and a current sensor positioned between the charging FET and the discharging FET;
 measuring an actual current value through the current regulation device using the current sensor;
 computing a charging control signal based on an error between the charging target current value and the actual current value through the current regulation device;
 using the charging control signal to regulate the charging current by the charging FET in the current regulation device;
 computing a discharging control signal based on an error between the discharging target current value and the actual current value through the current regulation device; and
 using the discharging control signal to regulate the discharging current by the discharging FET in the current regulation device.

14. The method of claim 13 wherein the charging FET provides minimal restriction to discharging current, and the discharging FET provides minimal restriction to charging current.

15. The method of claim 13 wherein the charging and discharging current values are converted from pulse width modulation (PWM) duty cycle percentages to amperage values before being used to compute the control signals.

16. The method of claim 13 wherein computing a charging control signal and a discharging control signal include using proportional-integral control loops.

17. The method of claim 13 wherein two or more of the battery packs are used in an energy storage system, and charging and discharging current are regulated for each of the battery packs individually.

18. The method of claim 17 wherein the two or more battery packs have different states of health, different storage capacities, or different chemistries.

* * * * *